United States Patent [19]

Garcia et al.

[11] Patent Number: 5,347,544

[45] Date of Patent: Sep. 13, 1994

[54] GAIN OR LOSS COMPENSATION CIRCUIT FOR TELEPHONE LINES

[75] Inventors: Frank X. Garcia; Bruce R. Miller, both of Aurora, Ill.

[73] Assignee: Teltrend Inc., St. Charles, Ill.

[21] Appl. No.: 56,412

[22] Filed: May 3, 1993

[51] Int. Cl.⁵ .............................................. H04B 3/04
[52] U.S. Cl. ...................................... 375/36; 375/22; 370/9; 379/400
[58] Field of Search ............................. 375/22, 36, 98; 370/8-9, 32.1; 332/109; 379/400-404

[56] References Cited

U.S. PATENT DOCUMENTS

| | | | |
|---|---|---|---|
| 3,936,602 | 2/1976 | Korver | 375/36 |
| 4,192,007 | 3/1980 | Becker | 375/36 |
| 4,315,107 | 2/1982 | Ciesielka et al. | 379/400 |
| 4,331,843 | 5/1982 | Tarr et al. | 379/403 |
| 4,377,730 | 3/1983 | Gay et al. | 379/402 |
| 4,489,222 | 12/1984 | Lusignan et al. | 379/402 |
| 4,787,080 | 11/1988 | Yamakido et al. | 370/32.1 |
| 5,034,978 | 7/1991 | Nguyen et al. | 379/402 |
| 5,133,006 | 7/1992 | Khuat | 379/399 |
| 5,151,936 | 9/1992 | Riedle | 379/403 |
| 5,172,411 | 12/1992 | Gazsi | 379/402 |
| 5,175,763 | 12/1992 | Gazsi | 379/402 |
| 5,175,764 | 12/1992 | Patel et al. | 379/412 |
| 5,253,291 | 10/1993 | Naseer et al. | 379/406 |

FOREIGN PATENT DOCUMENTS

0503528  9/1992  European Pat. Off. ............. 379/399

OTHER PUBLICATIONS

Brochure excerpt, 8-Bit Embedded Controller Handbook, Intel Corporation, 1991.
Brochure excerpt, Data Book-Microcontroller, Fifth Edition, OKI Semiconductor, Jun. 1990.
Brochure excerpt, Integrated Circuits Data Handbook-80C51-Based 8-Bit Microcontrollers, Signetics Company-Philips Semiconductors, Feb. 1992.
Brochure excerpt, Telecommunications Databook, National Semiconductor Corporation, 1992 Edition.
Brochure, PBL 3798 Subscriber Line Interface Circuit, Ericsson Components AB, Sep. 1989.
Brochure excerpt, Line Card ICs Databook, First Edition, ST® SGS-Thomson Microelectronics, Oct. 1989.

Primary Examiner—Stephen Chin
Assistant Examiner—Young Tse
Attorney, Agent, or Firm—Allegretti & Witcoff, Ltd.

[57] ABSTRACT

A compensation circuit for adjusting the gain or loss of a four to two wire hybrid circuit in a telephone system automatically, regardless of the length of the telephone line interconnected to the hybrid circuit. The compensation circuit includes a converter, interface, gate array, and controller. The converter, which includes an amplifier with a variable gain, is connected to a digital carrier transmission line. The converter accepts a digital data signal and converts it to an analog intermediate signal. The interface receives the analog intermediate signal and transmits an analog telephone signal, along a customer loop telephone line, to a telephone. The interface also includes a pulse width modulated power converter for which the pulse width varies according to the length of the telephone line between the compensation circuit and the telephone. The gate array senses the pulse width and responsively provides a measured signal to the controller. The controller receives the measured signal, representing the pulse width, as well as a voltage signal, representing the voltage powering the interface, and responsively adjusts the gain or loss of the gain of the variable amplifier.

5 Claims, 4 Drawing Sheets

GAIN OR LOSS COMPENSATION CIRCUIT FOR TELEPHONE LINES

COPYRIGHT

A portion of the disclosure of the patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to compensation circuits used with telecommunication transmission facilities and, more particularly, to automatic gain and loss compensation circuits used in remote terminal units. Many telecommunications transmission facilities include a central office which may transmit data signals over transmission lines to remote terminals and customer premises. The signals may be sent over two pairs of transmission lines in a digital format or differentially on two conductors, known as the Tip-Ring Pair.

The Bell telephone system in the United States, for example, has a widely utilized Digital "D" multiplexing pulse code modulation systems. A "D" channel bank, for example, commonly provides multiple DS-1 signals that are carried on a T-1 transmission system. One pair of cables is provided for each direction of transmission.

Signals which are sent via digital carrier transmission lines from the central office reach a remote terminal before reaching the customer premises. The remote terminal then converts the digital signals to an analog signal which may then be an intelligible signal for the telephone.

Thus, in the remote terminal, the digital data signals, sent over the T-1 lines, are convened to analog telephone signals and then supplied to a customer loop telephone line. The analog telephone signals may then be received by the customer premises, which may include telephones and, in some cases, PBX units. Conversely, the remote terminals receive analog telephone signals from the telephones and PBX units and convert them to digital data signals, which then can be transmitted over the T-1 transmission system.

The length of the telephone line between the remote terminal and the PBX unit or telephone in the customer premises may vary substantially. The length of the line affects the impedance of the line and, thus, for example, the amplitude of signals between the remote terminal and the customer premises.

If the remote terminal provides an analog telephone signal to the telephone line at a predetermined gain, regardless of the length of the telephone line, the sound on the telephone may be too loud if the telephone line is relatively short and may be too weak if the distance is relatively long. With many presently available remote terminals, the amount of amplification, or gain, that the remote terminal uses in converting the digital data signals to analog telephone signals or analog telephone signals to digital data signals may vary by manually adjusting the gain of the converter to be consistent with the length of the telephone line in that particular location.

SUMMARY OF THE INVENTION

In a principal aspect, the present invention relates to a gain and loss compensation circuit for a digital transmission system. The digital transmission system includes a digital carrier transmission line and a customer loop telephone line. The circuit includes a converter, an interface circuit, a gate array, and a microprocessor. The converter is interconnected to the receive transmission line, accepts the digital data signal, and converts it to an intermediate analog signal. Conversely, the converter also receives an intermediate analog signal from the interface circuit, converts it to a digital data signal, and transmits it along the transmit transmission line. The operation of the converter, and, thus, the gain used by the converter in performing such conversions, is related to a compensation signal that the converter receives.

The interface circuit receives the intermediate analog signal from the converter and provides an analog receive telephone signal to the telephone line, which is ultimately interconnected to the customer's telephone. Conversely, the interface circuit also receives an analog transmit telephone signal and provides an intermediate analog signal to the converter.

The interface circuit also includes a pulse width modulated power converter. The power converter provides pulses having a particular pulse width. Further, the interface circuit provides a direct current along the telephone line, and the amplitude of the current is related to the pulse width.

The gate array senses the pulse width of the power converter in the interface circuit and responsively provides a measured signal to the microprocessor. The microprocessor receives the measured signal and responsively provides compensation signal to the converter, so that gain of the converter is consistent with the length of the telephone line between the remote terminal and customer premises.

Thus, an object of the present invention is an improved gain and loss compensation circuit within a digital transmission line system. Yet another object is an improved gain and loss compensation circuit that more automatically adjusts the gain of a remote terminal unit. These and other objects, features, and advantages of the present invention are discussed or are apparent in the following detailed description.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
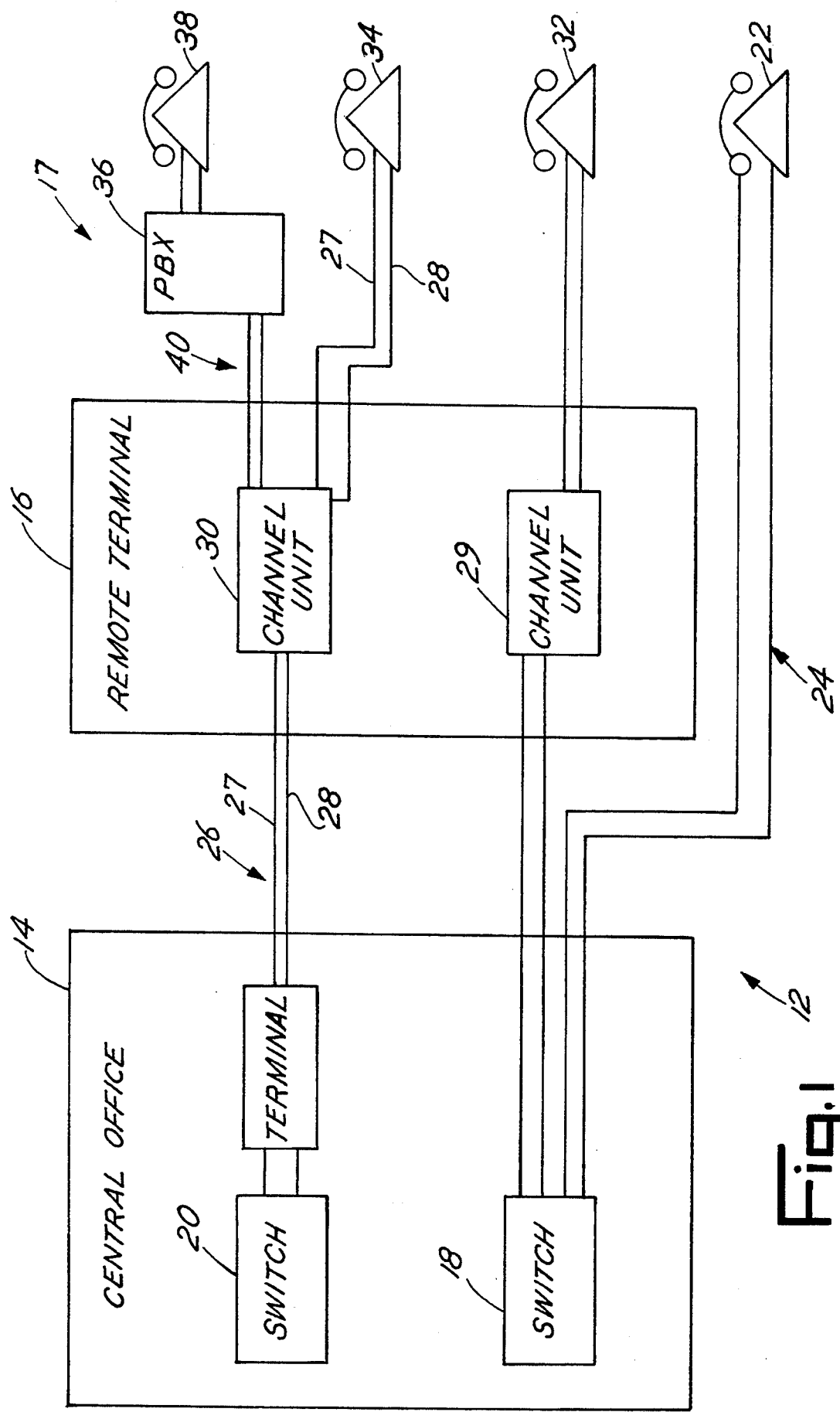
FIG. 1 is a block diagram showing a digital transmission line system.
Figure 2:
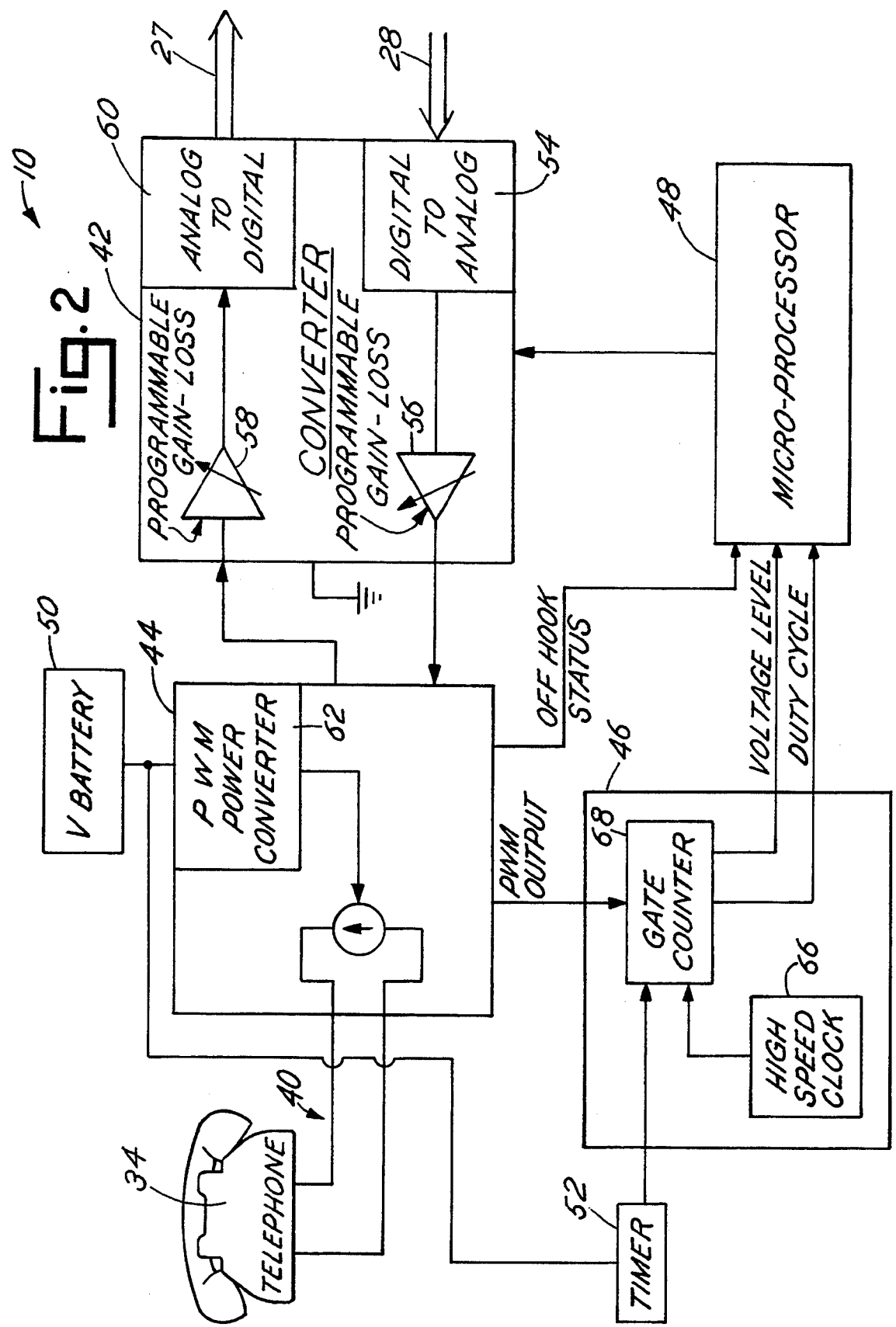
FIG. 2 is a block diagram of a preferred embodiment of the present invention, which may be used in the digital transmission line system shown in FIG. 1.

Referring to FIGS. 1-4, the preferred embodiment of the present invention is shown as a gain and loss compensation circuit 10 for digital telecommunication transmission facilities 12. As shown in FIG. 1, the telecommunication transmission facilities include a central office 14, a remote terminal 16, and customer premises 17.

The central office 14 includes first and second switches 18, 20. The first switch 18 is shown, for example, as directly interconnected to a user telephones 22 via two-wire telephone lines 24. The switch 18 in the central office 14 provides an analog signal to communicate with the telephones 22.

Still further, the switch 20 of the central office 14 sends a digital (rather than analog) data signal to the remote terminal 16 via digital carrier transmission lines 26. Each digital carrier transmission line 26 includes both transmit and receive pairs of cables 27, 28. The digital carrier transmission lines 26 provide digital data signals to the remote terminal 16.

The remote terminal 16 include channel units 29, 30, which may communicate with the customer premises 17. The customer premises 17 may include a first telephone 32, a second telephone 34, a PBX interface unit 36, and a third telephone 38. The channel units 29, 30 are interconnected to the digital carrier transmission lines 26 and convert a digital data signal to an analog telephone signal and provide the telephone signal to customer loop telephone lines 40 between the remote terminal 16 and customer premises 17.

The length of the customer loop telephone lines 40 may vary substantially, thus affecting the manner in which the remote terminal 16 should convert the digital data signals into analog telephone signals and visa versa.

The compensation circuit 10 includes a converter 42, interface circuit 44, gate array 46, microprocessor 48, DC power source 50, and timer, or measurement circuit 52. The converter 42 of the preferred embodiment is manufactured on a chip by the National Semiconductor (and AT&T and SGS Thompson) and is a 3072 or equivalent COMBO II Programmable PCM CODEC/-Filter.

The converter 42 is interconnected to both the transmit and receive transmission lines 27, 28. When the receive transmission line 28 provides a signal to the converter 42, it converts the digital data signal to an intermediate analog signal with a digital to analog converter 54. The analog signal is then conditioned (amplified or decreased in level—which is also referred to as chancing the gain or loss of the converter 42) with a programmable, variable gain amplifier 56. The gain of the variable gain amplifier 56 relates to a compensation signal received by the converter 42 from the microprocessor 48.

Similarly, the converter 42 also receives an intermediate analog signal from the interface circuit 44. The converter 42 includes a programmable, variable gain amplifer 58, which increases or decreases the amplitude of the signal, in accordance with the compensation signal received from the microprocessor 48. The converter 42 further includes an analog to digital converter 60, which converts the intermediate analog signal to a digital data signal and then transmits a digital data signal along the digital carrier transmission transmit line 27.

The interface circuit 44 receives the intermediate analog signal from the converter 42 and thereafter supplies an analog telephone signal to the telephone line 40. The telephone line 40 may consist of, for example, a tip and ring pair. Typically, the voltage of the tip wire is approximately 0 volts, and the ring wire is at a −48 volt potential. The interface circuit 44 provides approximately 26 milliamps direct current to power the telephone 34 (or other customer premises equipment).

The interface circuit 44 is powered by a DC power supply 50, which may be, for example, a 48 volt battery.

In the preferred embodiment, the interface circuit 44 is a subscriber loop interface circuit chip manufactured by Ericsson Components AB, S-164 81, Kista-Stockholm, Sweden, that is a PBL3798 SLIC chip.

The interface circuit 44 provides transmission and signaling functions. It converts the two wire, bi-directional, analog telephone signals to 4-wire, uni-directional, intermediate analog signals. Further, as discussed above, it provides a constant DC current to the off hook customer loop, and also provides a pulse width modulated digital signal with a duty cycle that is directly proportional to the customer loop telephone line length and tip to ring voltage. The interface circuit 44 also provides an off hook status signal to the microprocessor 48, indicating when the telephone 34 has been taken off hook and, thus, is in use.

The interface circuit 44 includes a pulse width modulated (PWM) power convertor 62. The pulse width modulated signal varies the pulse width, or has a "duty cycle," that varies according to the impedance level of the customer loop telephone line 40 sensed by the interface circuit 44.

Accordingly, a signal indicating the pulse width modulated output of the PWM power convertor 62 is provided to the gate array 46. The array 46 includes a high-speed, 16-megahertz clock generator 66 and counter 68. The counter 68 detects how many high speed clock pulses occur during one millisecond when turned on by pulses of the PWM power convertor 62. The gate array 46 provides a measured signal to the microprocessor 48, which indicates the pulse width, or duty cycle, of the PWM power converter.

Further, the timer, or measurement circuit 52, provides a timing signal indicating the battery voltage supplied to the interface circuit 44. This voltage may, for example, vary between −42 and −56 volts. The array 46, in turn, provides a voltage level signal, indicating the battery voltage, to the microprocessor 48.

The microprocessor 48 in the preferred embodiment is an Intel 8751BH microprocessor. which includes a Read Only Memory look up table.

Figure 3:
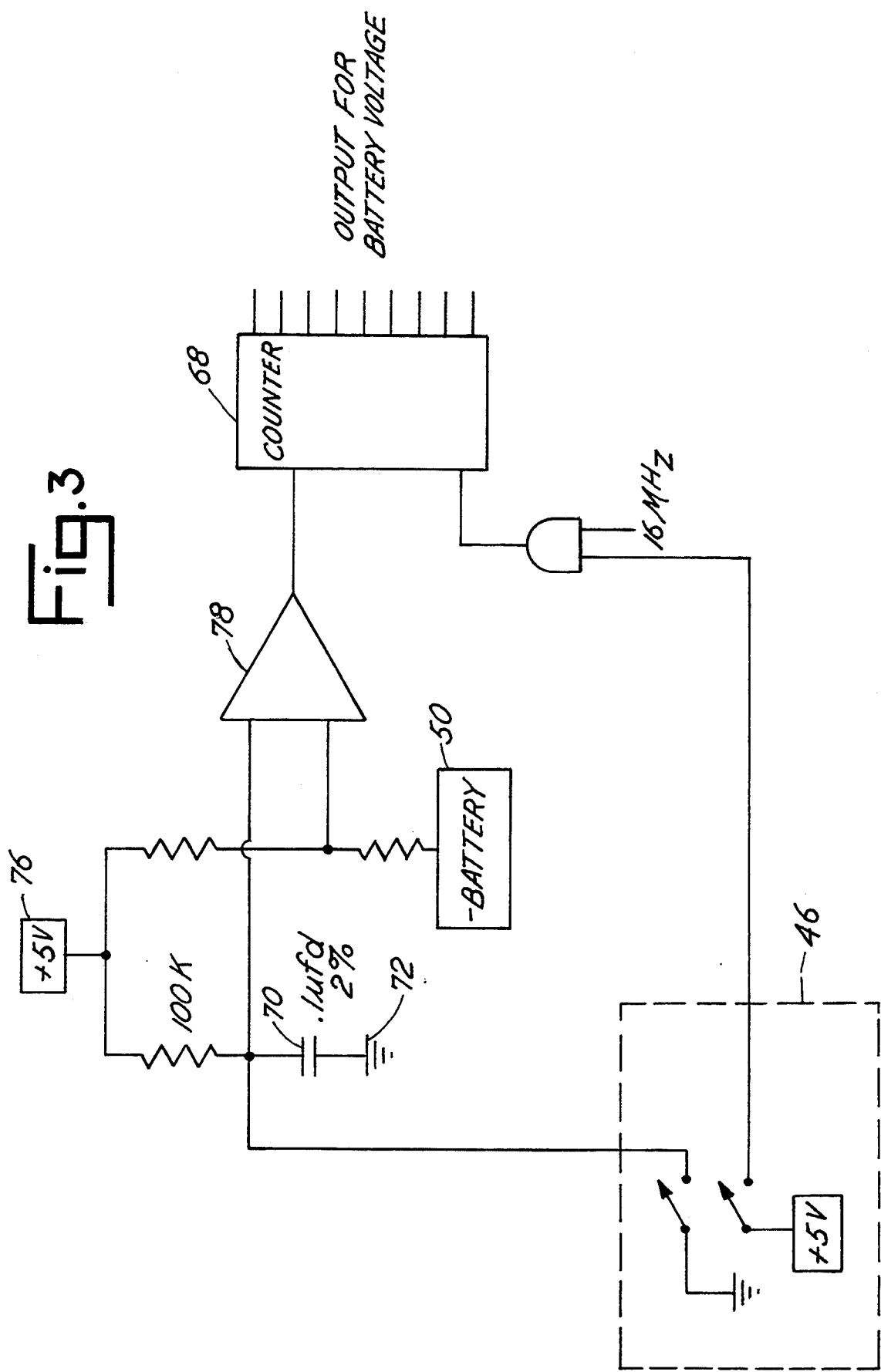
FIG. 3 is a circuit diagram of the timer used in the preferred embodiment shown in FIG. 2.
Figure 4:
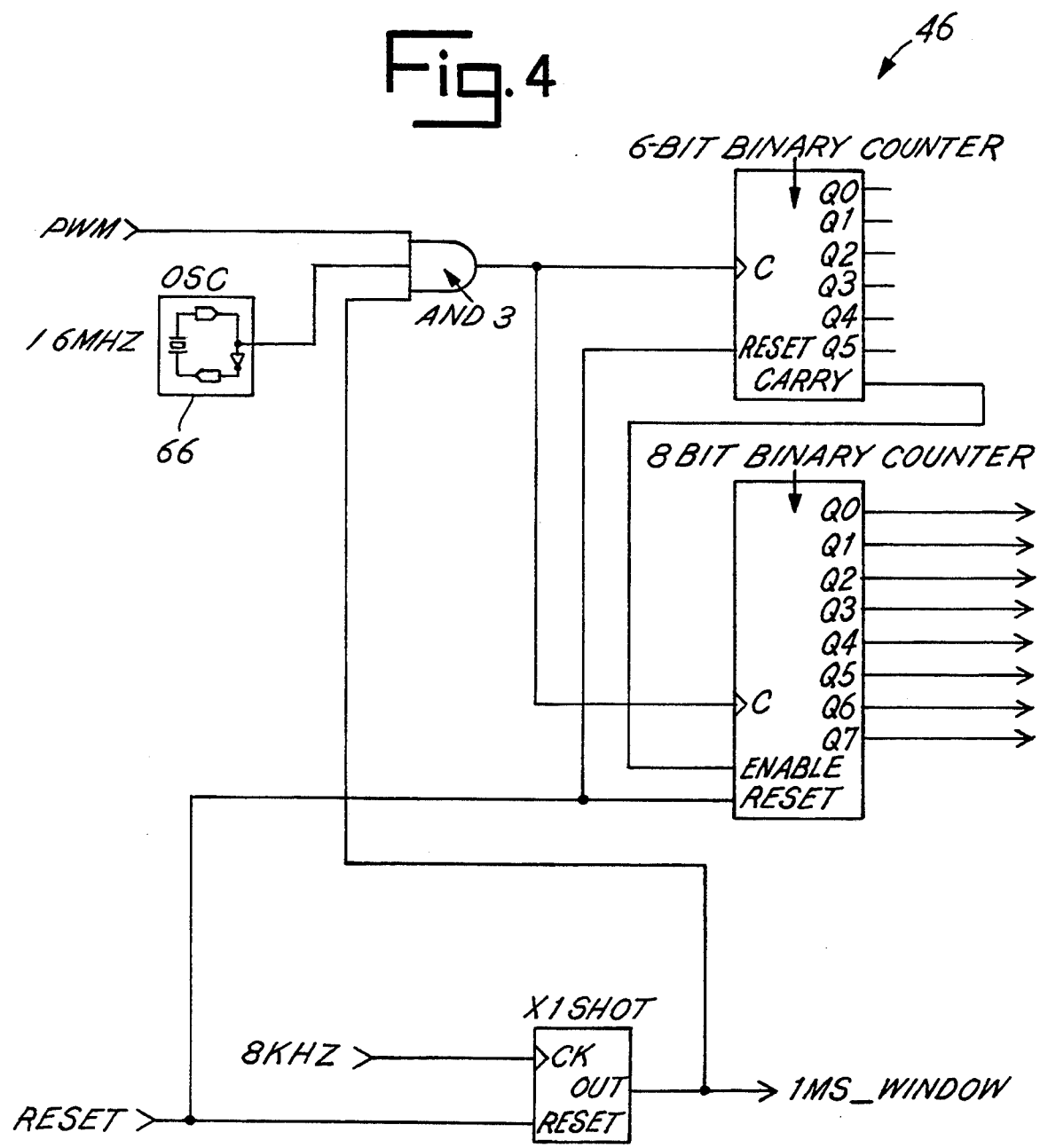
FIG. 4 is a circuit diagram of the gate array of the preferred embodiment shown in FIG. 2.

FIG. 3 shows the details of the timer 52. The voltage supplied to the interface circuit 44 is determined using the timer 52. A 0.1 microfarad capacitor 70 (approximately 2% tolerance) is interconnected between ground 72 and the gate array 46. Periodically, the gate array 46 moves the capacitor 70 from being grounded on both sides to being interconnected to a +5 volt supply 76 via a 100K ohm resistor, providing a change of state signal to a comparator 78 when the capacitor changes to a level determined by the +5 V supply 76 and the battery supply 50. The gate array 46 then counts how long it takes for the comparator 78 to change states. This time is directly proportional to the voltage of the battery 50, since the +5 V supply 76 is constant. A voltage level signal is then supplied by the gate array 46 to the microprocessor 48 for use in determining the appropriate compensation signal to be supplied to the programmable amplifiers 56, 58 of the converter 42.

The look up table includes 32 different categories of data (in ½ volt increments). Each of the 32 categories relate to a particular battery voltage sensed. Accordingly, upon receiving the battery voltage signals, the microprocessor 48 will then "look up" the appropriate category of data for the sensed battery voltage and duty cycle data and thereafter provide a compensation signal to the converter 42 for each of the programmable gain/-loss amplifiers 56, 58 in the converter 42.

The automatic-loss-compensation circuit objective is to provide a fixed loss between the customer and the network direction, and between the network and the customer. An on-hook to off-hook status change starts the microprocessor algorithm. The interface circuit 44 senses the off-hook condition, regulates the current towards the loop, signals the off-hook status to the microprocessor 48, and provides a PWM digital signal with a duty cycle that is proportional to the cable resistance.

The counter 68 accumulates high speed clock transitions during the PWM signal's active high state noise and transients. The microprocessor 48 also reads the battery voltage and compensates the count for voltage variations.

The microprocessor 48 internally has a lookup table that fully characterizes the telephone line loss. The microprocessor 48 provides the appropriate gain and loss coefficients that provide a fixed bi-directional loss of appropriately −3.5 dBm. This process is constantly repeated during the off-hook condition. A description of the steps taken by the microprocessor 48 in determining the transmit gain for the programmable amplifier 58 follows.

| 1. | Lower Reset Line |
| | Wait More than 1 millisecond |
| 2. | Read PWM count |
| 3. | Read Battery Voltage |
| 4. | Use Battery Voltage and PWM count to point to the ROM look up table: (Each block is divided into ½ volt segments.) (Lower numbers = shorter lines.) |
| 5. | Take number |
| | For transmit level, add number to 28H (offset number) |
| | For Example: | |
| | number from memory | 01H |
| | add offset number | 28H |

| Result | 29H |
| Convert to Binary | 0010-1001 |
| Invert | 1101-0110 |
| Rotate | 0110-1011 |
| Write the number to converter transmit register 58 | |

A description of the steps taken by the microprocessor 48 in determining the receive gain for the programmable amplifier 58 follows.

| 1. | Lower Reset Line |
| | Wait more than 1 millisecond |
| 2. | Read PWM count |
| 3. | Read Battery Voltage |
| 4. | Use Battery Voltage and PWM count to point to the ROM look up table. (Each block divided into ½ volt segments). |
| 5. | Take number from look up table |
| | Subtract that number from the Receive Off set number |
| | Convert to Binary |
| | Invert |
| | Rotate |
| | Write to Receive Amplifier |
| | For Example: | |
| | Receive off set. | 3AH |
| | Number from look up table | 01H |
| | Subtraction. | 39H |
| | Convert to Binary | 0011 1001 |
| | Invert | 1100 0110 |
| | Rotate | 0110 0011 |
| | Write to Receive Register of D to A converter | |

A copy of the microprocessor source code listing for automatic loss compensation, in the C language, follows.

```
/*****************************************************************/
/*                    COPYRIGHT 1991                             */
/*                TELTREND INCORPORATED                          */
/*                 ALL RIGHT RESERVED                            */
/*****************************************************************/
/*aschedul.c                                                     */
/*****************************************************************/
/*    APLICATION POWER and PULSE WIDTH COUNT READ AND SCHEDULE   */
/*                   FOR UVG159 (ALC)                            */
/*****************************************************************/
/* count_read_schedule_setup()                                   */
/*This routine schedules the LSI to setup count for either power or pulse */
/*width count. It also reads the required count accordingly to the previous */
/*schedule.                                                      */
/*****************************************************************/ include <reg51.h>      /*Franklin 8051 resgister header file */
include <aportdf.h>    /*Aplication port definition header file */
#include <extern.h>     /*Module extern structure and rams file */
#include <avardef.h>    /*Aplication defined constant header file */
include <cvardef.h>    /*Core constant defined header file */ extern setup_to_program_combo();
extern calculate_loss();

schedule_setup(s_time)
data char s_time;
{
        if(s_time== schedule_for_setup_power)
        {
            {
                pulse_count_control=schedule_for_power;
                lca_rams_addr.AB_control=pulse_count_control;
                lca_rams_addr.AB_control=(pulse_count_control |
                        trigger_pulse_count);
```

```
        }
        return;
    }
if(s_time==schedule_for_read_power)
{
if(lca_rams_addr.AB_control!=no_count)
{
        power_count=lca_rams_addr.AB_control;
        power_A=lca_rams_addr.AB_control;
        power_B=lca_rams_addr.AB_control;
        lca_rams_addr.AB_control=pulse_count_control;
}
        return;
}
if(s_time== schedule_for_setup_pulse && CHANNEL==A_channel)
{
        if(Achannel_rams.new_tsig==OFF_HOOK | EFG_bits_default)
        {
        pulse_count_control=schedule_for_A_pulse;
        lca_rams_addr.AB_control=pulse_count_control;
        lca_rams_addr.AB_control=(pulse_count_control |
                trigger_pulse_count);
        )
        return;
}
if(s_time== schedule_for_read_pulse && CHANNEL==A_channel)
{
        if(Achannel_rams.new_tsig==OFF_HOOK | EFG_bits_default)
        {
                if(lca_rams_addr.AB_control!=no_count)
                {
                Achannel_rams.store_pulse_count=lca_rams_addr.AB_control
                pulse_A=lca_rams_addr.AB_control;
                pulse_count=Achannel_rams.store_pulse_count;
                channel_pointer = &Achannel_rams;
                lca_rams_addr.AB_control=pulse_count_control;
                setup_to_program_combo();
                if(combo_ready==No)
                {
                        combo_ready=YES;
                        calculate_loss();
                }
                }
        }
    return;
}
if(s_time==schedule_for_setup_pulse && CHANNEL==B_channel)
{
        if(Bchannel_rams.new_tsig==OFF_HOOK | EFG_bits_default)
        {
        pulse_count_control=schedule_for_B_pulse;
        lca_rams_addr.AB_control=pulse_count_control;
        lca_rams_addr.AB_control=(pulse_count_control |
                trigger_pulse_count);
}
return;
}
if(s_time== schedule_for_read_pulse && CHANNEL==B_channel)
{
        if(Bchannel_rams.new_tsig==OFF_HOOK | EFG_bits_default)
        {
                if(lca_rams_addr.AB_control!=no_count)
                {
                Bchannel_rams.store_pulse_count=lca_rams_addr.AB_control
                pulse_B=lca_rams_addr.AB_control;
                pulse_count=Bchannel_rams.store_pulse_count;
                channel_pointer=&Bchannel_rams;
                lca_rams_addr.AB_control=pulse_count_control;
                setup_to_program_combo();
                if(combo_ready==NO)
                {
                        combo_ready=YES;
                        calculate_loss();
                }
                }
        }
    return;
}
}
```

```
/*****************************************************************/
/*                      COPYRIGHT 1991                           */
/*                   TELTREND INCORPORATED                       */
/*                   ALL RIGHT RESERVED                          */
/*****************************************************************/
/*areverse.c                                                     */
/*****************************************************************/
/*            APLICATION REVERSE BITS BEFORE SET UP COMBO FOR ALC */
/*****************************************************************/
/* Reverse_bitf_for_8051_serialbus:                              */
/*This routine reverses all bits in the required byte before send out to the */
/*combo througth the 8051 serial bus .                           */
/*Note : for the 8051 ,the serial bus will shift out least significant bit */
/*first,but the national combo receives the most significant first. */
/*INPUT: char gain                                               */
/*OUTPUT : Same char with all bits are reversed                  */
/*****************************************************************/ include <extern.h>          /*Module extern structure and rams file */
include <avardef.h>         /*Aplication defined constant header file */ reverse_bit_for_8051_serialbus(gain)
unsigned char gain;
{
unsigned char temp_store;
common_input=gain;           /*Extern byte with bit addressable*/
temp_store=gain;
INPUT7=INPUT0;               /*Relococate low nibble */
INPUT6=INPUT1;
INPUT5=INPUT2;
INPUT4=INPUT3;
temp_store=common_input &0x0f0;  /*keep only bits (7-4) */
common_input=gain;
INPUT0=INPUT7;               /*Relocate the high nibble*/
INPUT1=INPUT6;
INPUT2=INPUT5;
INPUT3=INPUT4;
common_input=common_input & keep_low_nibble;/*Keep only bits(3-0)*/
gain=temp_store | common_input;
return(gain);
}

;*****************************************************************
;*                      COPYRIGHT 1991                           *
;*                   TELTREND INCORPORATED                       *
;*                   ALL RIGHT RESERVED                          *
;*****************************************************************
;dsoint.asm                                                      *
;*****************************************************************
;     PROGRAM COMBO EVERY (125 MICRO SECOND )INTERRUPT FOR UVG 159 ALC *
;*****************************************************************
;PROGRAM_COMBO:
;This routine programs the combo to the required gain or loss. It will power
;down the combo during program process and then repowerup the combo.
;INPUT: char rcv_gain,xmt_gain  (Global variable)
;     : bit combo_ready (Share between the two channels)
;OUTPUT: bit combo_ready will be clear (force to low)
;*****************************************************************
;EXTERN REFERRENCE
;*****************************************************************
$ INCLUDE (aasmblr.h)
EXTRN DATA (RCV_GAIN,XMT_GAIN,SYSTEM_FLAG,BAL1VAL,BAL2VAL,BAL3VAL)
EXTRN BIT  (combo_ready)
;*****************************************************************
;INTERN DECLARATION
LOWER   SEGMENT CODE
PUBLIC  PROGCOMBO
RSEG    LOWER
;*****************************************************************
PROGCOMBO:
        MOV     IE,#NO_DSOINT           ;DISABLE DSO INTERRUPT
        MOV     R0,#E_OUTADDR           ;LOAD E REGISTER ADDRESS IN R0
        ;SET UP FOR RECEIVE GAIN
        MOV     R5,#COMBO3 AND 0feh     ;LOAD RCV_GAIN ADDRESS FOR THE COMBO
        MOV     R6,RCV_GAIN             ;LOAD RCV_GAIN IN THE ACCUMULATOR
        ACALL   SERIALDUMP              ;GO AND SEND OUT
        ;SET UP FOR TRANSMIT GAIN
        MOV     R5,#COMBO4 AND 0feh     ;LOAD XMT_GAIN ADDRESS FOR THE COMBO
        MOV     R6,XMT_GAIN             ;LOAD XMT_GAIN IN THE ACCUMULATOR
        ACALL   SERIALDUMP              ;GO AND SEND OUT
```

```
                ;SET UP FOR HYBRID BALANCE 1
        MOV     R5,#WHYBAL1             ;LOAD HYBRID BAL1 ADDRESS
        MOV     R6,BAL1VAL              ;LOAD HYBRID BALANCE 1 VALUE
        ACALL   SERIALDUMP              ;GO AND SEND OUT

;SET UP FOR HYBRID BALANCE 2
        MOV     R5,#WHYBAL2             ;LOAD HYBRID BAL1 ADDRESS
        MOV     R6,BAL2VAL              ;LOAD HYBRID BALANCE 2 VALUE
        ACALL   SERIALDUMP              ;GO AND SEND OUT

;SET UP FOR HYBRID BALANCE 3
        MOV     R5,#WHYBAL3             ;LOAD HYBRID BAL3 DDRESS
        MOV     R6,BAL3VAL              ;LOAD HYBRID BALANCE 3 VALUE
                ;THIS ROUTINE SEND OUT DATA TO COMBO
                ;IT SEND THE ADDRESS (R5) FIRST,AND THE DATA IN (R6)
SERIALDUMP:
        MOV     A,#CBLISTEN             ;MAKE THE COMBO LISTEN
        MOVX    @R0,A                   ;SEND IT OUT
        CLR     TI                      ;SET UP FOR TRANSMISSION
        MOV     A,R5                    ;LOAD THE ADDRESS IN ACCUMULATOR
        MOV     SBUF,A                  ;SEND OUT TO SERIAL BUS
        MOV     A,R6                    ;LOAD DATA IN THE ACCUMULATOR
WAITR1: JNB     TI,WAITR1               ;IF TRANSMIT NOT READY WAIT
        CLR     TI                      ;SET UP FOR TRANSMISSION
        MOV     SBUF,A                  ;LOAD DATA IN SERIAL BUS
        CLR     A                       ;SET UP FOR COMBO LATCH
WAITR2: JNB     TI,WAITR2               ;IF TRANSMIT NOT READY WAIT
        MOVX    @R0,A                   ;MAKE THE COMBO LATCH THE DATA
        CLR     COMBO_READY             ;
        RET
        END
```

```c
/********************************************************************/
/*                      COPYRIGHT 1991                              */
/*                  TELTREND INCORPORATED                           */
/*                  ALL RIGHT RESERVED                              */
/********************************************************************/
/********************************************************************/
/*           APLICATION SETUP TO PROGRAM COMBO FOR UVG159 ALC       */
/********************************************************************/
/*setup_to_program_combo:                                           */
/*This routine analyzes the power count and pulse width count and depending */
/*the condition of the two counts ,it will set up to program the combo */
/*properly.                                                         */
/*INPUT: char power_count,pulse_count (Global variables)            */
/*OUTPUT : NONE                                                     */
/********************************************************************/
#include <extern.h>          /*Module extern structure and rams file */
include <avardef.h>         /*Aplication defined constant header file */
#include <cvardef.h>         /*Core constant defined header file */
extern code     load_p42table();
extern code     load_p43table();
extern code     load_p44table();
extern code     load_p45table();
extern code     load_p46table();
extern code     load_p47table();
extern code     load_p48table();
extern code     load_p49table();
extern code     load_p50table();
extern code     load_p51table();
extern code     load_p52table();
extern code     load_p53table();
extern code     load_p54table();
extern code     load_p55table();
extern code     load_p56table();
extern void calculate_loss();
extern reverse_bit_for_8051_serialbus( unsigned char);
extern code get_gain_loss(unsigned char);
setup_to_program_combo()
{
        if(power_count > pwmvth43)
        {
                if(pulse_count < min42count)
                                /*42 volt power supply */
                {
                        cable_loss=min_gain_loss;
                        return;
                }
                if(pulse_count > max42count)
                {
```

```
                cable_loss=max_gain_loss;
                return;
        }
        load_p42table();
        table_index=pulse_count-min42count;
        cable_loss=get_gain_loss(table_index);
        return;
}
if((power_count > pwmvth44) && (power_count <pwmvth43 ||
        power_count==pwmvth43))
{
    if(pulse_count < min43count)
        /*43 volt power supply */
    {
        cable_loss=min_gain_loss;
        return;
    }
    if(pulse_count >max43count)
    {
        cable_loss=max_gain_loss;
        return;
    }
    load_p43table();
    table_index=pulse_count-min43count;
    cable_loss=get_gain_loss(table_index);
    return;
}
if((power_count > pwmvth45) && (power_count < pwmvth44 ||
        power_count == pwmvth44))
{
    if(pulse_count < min44count)
    /*44 volt power supply */
    {
        cable_loss=min_gain_loss;
        return;
    }
    if(pulse_count > max44count)
    {
        cable_loss=max_gain_loss;
        return;
    }
    load_p44table();
    table_index=pulse_count-min44count;
    cable_loss=get_gain_loss(table_index);
    return;
}
if((power_count > pwmvth46) && (power_count < pwmvth45 ||
        power_count == pwmvth45))
{
    if(pulse_count < min45count)
    /*44 volt power supply */
    {
        cable_loss=min_gain_loss;
        return;
    }
    if(pulse_count > max45count)
    {
        cable_loss=max_gain_loss;
        return;
    }
    load_p45table();
    table_index=pulse_count-min45count;
    cable_loss=get_gain_loss(table_index);
    return;
}
if((power_count > pwmvth47) && (power_count < pwmvth46 ||
        power_count == pwmvth46))
{
    if(pulse_count < min46count)
    /*44 volt power supply */
    {
        cable_loss=min_gain_loss;
        return;
    }
    if(pulse_count > max46count)
    {
        cable_loss=max_gain_loss;
        return;
    }
```

```c
                load_p46table();
                table_index=pulse_count-min46count;
                cable_loss=get_gain_loss(table_index);
        return;
} if((power_count > pwmvth48) && (power_count < pwmvth47 ||
                power_count == pwmvth47))
{
        if(pulse_count < min47count)
/*44 volt power supply */
        {
                cable_loss=min_gain_loss;
                return;
        }
        if(pulse_count > max47count)
        {
                cable_loss=max_gain_loss;
                return;
        }
                load_p47table();
                table_index=pulse_count-min47count;
                cable_loss=get_gain_loss(table_index);
                return;
} if((power_count > pwmvth49) && (power_count < pwmvth48 ||
                power_count == pwmvth48))
{
        if(pulse_count < min48count)
/*44 volt power supply */
        {
                cable_loss=min_gain_loss;
                return;
        }
        if(pulse_count > max48count)
        {
                cable_loss=max_gain_loss;
                return;
        }
                load_p48table();
                table_index=pulse_count-min48count;
                cable_loss=get_gain_loss(table_index);
                return;
} if((power_count > pwmvth50) && (power_count < pwmvth49 ||
                power_count == pwmvth49))
{
        if(pulse_count < min49count)
/*44 volt power supply */
        {
                cable_loss=min_gain_loss;
                return;
        }
        if(pulse_count > max49count)
        {
                cable_loss=max_gain_loss;
                return;
        }
                load_p49table();
                table_index=pulse_count-min49count;
                cable_loss=get_gain_loss(table_index);
                return;
} if((power_count > pwmvth51) && (power_count < pwmvth50 ||
                power_count == pwmvth50))
{
        if(pulse_count < min50count)
/*44 volt power supply */
        {
                cable_loss=min_gain_loss;
                return;
        }
        if(pulse_count > max50count)
        {
                cable_loss=max_gain_loss;
                return;
        }
```

```
        }
                load_p50table();
                table_index=pulse_count-min50count;
                cable_loss=get_gain_loss(table_index);
                return;
} if((power_count > pwmvth52) && (power_count < pwmvth51 ||
                power_count == pwmvth51))
{
        if(pulse_count < min51count)
    /*44 volt power supply */
        {
                cable_loss=min_gain_loss;
                return;
        }
        if(pulse_count > max51count)
        {
                cable_loss=max_gain_loss;
                return;
        }
                load_p51table();
                table_index=pulse_count-min51count;
                cable_loss=get_gain_loss(table_index);
                return;
}
if((power_count > pwmvth53) && (power_count < pwmvth52 ||
                power_count == pwmvth52))
{
        if(pulse_count < min52count)
    /*44 volt power supply */
        {
                cable_loss=min_gain_loss;
                return;
        }
        if(pulse_count > max52count)
        {
                cable_loss=max_gain_loss;
                return;
        }
                load_p52table();
                table_index=pulse_count-min52count;
                cable_loss=get_gain_loss(table_index);
                return;
}
if((power_count > pwmvth54) && (power_count < pwmvth53 ||
                power_count == pwmvth53))
{
        if(pulse_count < min53count)
    /*44 volt power supply */
        {
                cable_loss=min_gain_loss;
                return;
        } if(pulse_count > max53count)
        {
                cable_loss=max_gain_loss;
                return;
        }
                load_p53table();
                table_index=pulse_count-min53count;
                cable_loss=get_gain_loss(table_index);
                return;
}
if((power_count > pwmvth55) && (power_count < pwmvth54 ||
                power_count == pwmvth54))
{
        if(pulse_count < min54count)
    /*44 volt power supply */
        {
                cable_loss=min_gain_loss;
                return;
        }
        if(pulse_count > max54count)
        {
                cable_loss=max_gain_loss;
                return;
        }
```

```
                load_p54table();
                table_index=pulse_count-min54count;
                cable_loss=get_gain_loss(table_index);
                return;
        } if((power_count > pwmvth56) && (power_count < pwmvth55 ||
                        power_count == pwmvth55))
        {
                if(pulse_count < min55count)
            /*44 volt power supply */
                {
                        cable_loss=min_gain_loss;
                        return;
                }
                if(pulse_count > max55count)
                {
                        cable_loss=max_gain_loss;
                        return;
                }
                load_p55table();
                table_index=pulse_count-min55count;
                cable_loss=get_gain_loss(table_index);
                return;
        } if(power_count < pwmvth56 || power_count == pwmvth56)
        {
                if(pulse_count < min56count)
                    /*56 volt power supply */
                {
                        cable_loss=min_gain_loss;
                        return;
                }
                if(pulse_count > max56count)
                {
                        cable_loss=max_gain_loss;
                        return;
                }
                load_p56table();
                table_index=pulse_count-min56count;
                cable_loss=get_gain_loss(table_index);
                return;
        }
}

/*******************************************************************/
/*                    COPYRIGHT 1991                                */
/*                  TELTREND INCORPORATED                           */
/*                   ALL RIGHT RESERVED                             */
/*******************************************************************/
/*apldet.c                                                          */
/*******************************************************************/
/*            APLICATION DETECTOR PROCESSING FOR UVG159             */
/*******************************************************************/
/* apl_detectors_processing:                                        */
/*This routine observes all the detector inputs and current configuration of */
/* the channel(relay status) and formats the right transmit signalling to */
/* send out to another end. It also control the busy LED in front pannel. */
/* In addition,whenever the channel goes off hook ,this module will start to */
/* schedule and set up to program the two combos for ALC            */
/*******************************************************************/ include <reg51.h>        /*Franklin 8051 resgister header file */
include <aportdf.h>      /*Aplication port definition header file */
#include <extern.h>       /*Module extern structure and rams file */
#include <avardef.h>      /*Aplication defined constant header file */
include <ovardef.h>      /*Core constant defined header file */ extern  apl_setup_slic_chip();
extern  schedule_setup(char);/*Setup Combo auto gain loss */
extern  void calculate_loss();
extern  setup_to_program_combo();
extern  reverse_bit_for_8051_serialbus(char);
extern  go_for_update_gain_on_hook();

void apl_detectors_processing()
{
idata char slic_status;
```

```
if(CGA_flag)
{
        (*channel_pointer).new_tsig=ON_HOOK | EFG_bits_default;
        LED=IDLE;
        return;
}
if((*channel_pointer).event_timer!=no_delay)
{
        return;
}
slic_status=(*channel_pointer).out_to_slc;

/*Open Tip routine*/
if(slic_status==TIP_OPEN)
{
        if(LOOP==loop_active_low)
        {
                (*channel_pointer).new_tsig=RING_GROUND | EFG_bits_default;
                LED=BUSY;
                ring_ground_flag=YES;
                go_for_update_gain_on_hook();
                return;
        }
        else
        {
                if(ring_ground_flag==YES && hold_ring_ground_flag==NO)
                {
                        hold_ring_ground_flag=YES;
                        (*channel_pointer).event_timer=delay_for_release_ring_ro
                        return;
                }
                else
                {
                        if(ring_ground_flag==NO)
                        {
                                (*channel_pointer).new_tsig=ON_HOOK | EFG_bits_default;
                                LED=IDLE;
                                go_for_update_gain_on_hook();
                                return;
                        }
                }
        }
        return;
}
                /*Tip ground routine */
if(slic_status!=TIP_OPEN)
{
        if(ring_ground_flag==YES &&    hold_ring_ground_flag==NO)
        {
                hold_ring_ground_flag=YES;
                (*channel_pointer).event_timer=delay_for_release_ring_round;
                return;
        }
        if(LOOP==loop_active_low && ring_ground_flag==NO)
        {
                if(((*channel_pointer).tpcm_quiet_timer> spike_block_time)||
                   ((*channel_pointer).tpcm_quiet_timer==EXPIRED))
                {
                        if(slic_status==RINGING)
                        (*channel_pointer).tpcm_quiet_timer=EXPIRED;
                        update_gain_on_hook=NO;
                        (*channel_pointer).new_tsig=OFF_HOOK | EFG_bits_default;
                        (*channel_pointer).out_to_slc=NORMAL;/*Set up for ring s
                        ring_trip_flag=YES;
                        TPCM_QUIET=NO;
                        LED=BUSY;
                        if(CHANNEL==A_channel)
                        {
                                C1A=LOW;
                                lca_rams_addr.A_out_put=common_output;
                        }
                        else
                        {
                                C1B=LOW;
                                lca_rams_addr.B_out_put=common_output;
                        }
                        epl_setup_slic_chip();
                        if((*channel_pointer).off_hook_timer < max_count) DGAINLOSS=YES;
                        else DGAINLOSS=NO;
```

```
if(!DGAINLOSS && TEST_MODE==NO)
 {
  if(CHANNEL==A_channel && Bchannel_rams.gain_loss_scheduling
                  ==no_schedule)
  {
        (*channel_pointer).gain_loss_scheduling +=1;
        if((*channel_pointer).gain_loss_scheduling==5)
        {
        (*channel_pointer).gain_loss_scheduling=no_schedule;
        return;
        }
        else
        schedule_setup((*channel_pointer).gain_loss_scheduling);
  }
  if(CHANNEL==B_channel && Achannel_rams.gain_loss_scheduling
                  ==no_schedule)
  {
        (*channel_pointer).gain_loss_scheduling +=1;
        if((*channel_pointer).gain_loss_scheduling==5)
        {
        (*channel_pointer).gain_loss_scheduling=no_schedule;
        return;
        }
        else
         schedule_setup((*channel_pointer).gain_loss_scheduling)
  }
 }
else
 {
        if(ring_ground_flag==NO)
        {
        (*channel_pointer).new_tsig=ON_HOOK | EFG_bits_default;
        LED=IDLE;
        (*channel_pointer).gain_loss_scheduling=0;
        go_for_update_gain_on_hook();
        }
 }
}
/*********************************************************/
/*           UPDATE GAIN AND LOSS FOR ON HOOK             */
/*********************************************************/
extern code PROGCOMBO();
go_for_update_gain_on_hook()
{
unsigned char loss;
        loss=(*channel_pointer).on_hook_loss;
        (*channel_pointer).gain_loss_scheduling=no_schedule;
        if(DGAINLOSS)return; /*check for disable auto gain loss */
        (*channel_pointer).off_hook_timer=set_to_zero;
        if(update_gain_on_hook==NO)
        {
                if(CHANNEL==A_channel)
                        lca_rams_addr.AB_control=schedule_for_A_pulse;
                else
                        lca_rams_addr.AB_control=schedule_for_B_pulse;
                if(TEST_MODE==YES)
                {
                xmt_gain=xmt_gain_test_mode;
                rcv_gain=rcv_gain_test_mode;
                if(SLIC==ERICKSON_SLIC){
                        BAL1VAL=test_mode_eric_bal1;
                        BAL2VAL=test_mode_eric_bal2;
                        BAL3VAL=test_mode_eric_bal3;
                }
                else{
                        BAL1VAL=test_mode_amd_bal1;
                        BAL2VAL=test_mode_amd_bal2;
                        BAL3VAL=test_mode_amd_bal3;
                }
                }
                else/*Normal Mode*/
                {
                if((loss < val_1_5db || loss==val_1_5db))
                {
                        xmt_gain=xmt_gain_1quadrant_for_on_hook;
                        rcv_gain=rcv_gain_1quadrant_for_on_hook;
                        BAL1VAL=bal1_1quadrant_for_on_hook;
                }
```

```
            if((loss > val_1_5db) && (loss < val_3_0db))
            {
                    xmt_gain=xmt_gain_2quadrant_for_on_hook;
                    rcv_gain=rcv_gain_2quadrant_for_on_hook;
                    BAL1VAL=bal1_2quadrant_for_on_hook;
      }
            if((loss > val_3_0db)||( loss==val_3_0db))
            {
                    xmt_gain=xmt_gain_3quadrant_for_on_hook;
                    rcv_gain=rcv_gain_3quadrant_for_on_hook;
                    BAL1VAL=bal1_3quadrant_for_on_hook;
            }
     }
     rcv_gain=~rcv_gain;
     rcv_gain=reverse_bit_for_8051_serialbus(rcv_gain);
     xmt_gain =~xmt_gain;
     xmt_gain=reverse_bit_for_8051_serialbus(xmt_gain);
     PROGCOMBO();
     update_gain_on_hook=YES;
}
}

/*****************************************************************/
/*                    COPYRIGHT 1991                             */
/*                 TELTREND INCORPORATED                         */
/*                   ALL RIGHT RESERVED                          */
/*****************************************************************/
/*acalgain.c                                                     */
/*****************************************************************/
/*              APLICATION CALCULATE LOSS FOR UVG159              */
/*****************************************************************/
/* float calculate_loss:                                         */
/*This routine calculates cable_loss gain for different cable length */
/*INPUT: pulse_count,constant_mult,constant_subs (Global variables) */
/*OUTPUT : float calculte_cable_loss                             */
/*****************************************************************/ include <reg51.h>      /*Franklin 8051 resgister header file */
include <extern.h>     /*Module extern structure and rams file */
#include <avardef.h>    /*Aplication defined constant header file */
include <cvardef.h>    /*Core constant defined header file */ extern reverse_bit_for_8051_serialbus(char);
void calculate_loss()
{
unsigned int average=0;
unsigned int new_input=0;
unsigned char gain_change=0;
new_input=cable_loss;
                /*First Intergration */
     store_average=(*channel_pointer).previous_average;
     average=store_average;
     average=average-(average>>4);
     average=average+(new_input<<4);
     (*channel_pointer).previous_average=average;
     average=average>>8;
     cable_loss=average;
                            /*Second intergration */
     store_average=(*channel_pointer).previous_average1;
     average=store_average;
     average=average-(average>>4);
     new_input=cable_loss;
     average=average+(new_input<<4);
     (*channel_pointer).previous_average1=average;
     average=average>>8;
     cable_loss=average;
     if((cable_loss < val_1_5db) || cable_loss==val_1_5db)
         {
              if(SLIC==ERICKSON_SLIC){
              BAL1VAL=Fquadrant_bal_1_Eric_off_hook;
              BAL2VAL=Fquadrant_bal_2_Eric_off_hook;
              BAL3VAL=Fquadrant_bal_3_Eric_off_hook;
              }
              else{
              BAL1VAL=Fquadrant_bal_1_Amd_off_hook;
```

```
                BAL2VAL=Fquadrant_bal_2_Amd_off_hook;
                BAL3VAL=Fquadrant_bal_3_Amd_off_hook;
                } if((cable_loss > val_1_5db) && ((cable_loss <val_3_0db) ||
                (cable_loss==val_3_0db)))
                {
                if(SLIC==ERICKSON_SLIC){
                BAL1VAL=Squadrant_bal_1_Eric_off_hook;
                BAL2VAL=Squadrant_bal_2_Eric_off_hook;
                BAL3VAL=Squadrant_bal_3_Eric_off_hook;
                }
                else{
                BAL1VAL=Squadrant_bal_1_Amd_off_hook;
                BAL2VAL=Squadrant_bal_2_Amd_off_hook;
                BAL3VAL=Squadrant_bal_3_Amd_off_hook;
                }
                } if((cable_loss > val_3_0db) && ((cable_loss <val_4_5db) ||
                (cable_loss==val_4_5db)))
                {
                if(SLIC==ERICKSON_SLIC){
                BAL1VAL=Tquadrant_bal_1_Eric_off_hook;
                BAL2VAL=Tquadrant_bal_2_Eric_off_hook;
                BAL3VAL=Tquadrant_bal_3_Eric_off_hook;
                }
                else{
                BAL1VAL=Tquadrant_bal_1_Amd_off_hook;
                BAL2VAL=Tquadrant_bal_2_Amd_off_hook;
                BAL3VAL=Tquadrant_bal_3_Amd_off_hook;
                }
                } if((cable_loss > val_4_5db))
                {
                if(SLIC==ERICKSON_SLIC){
                BAL1VAL=Lquadrant_bal_1_Eric_off_hook;
                BAL2VAL=Lquadrant_bal_2_Eric_off_hook;
                BAL3VAL=Lquadrant_bal_3_Eric_off_hook;
                }
                else{
                BAL1VAL=Lquadrant_bal_1_Amd_off_hook;
                BAL2VAL=Lquadrant_bal_2_Amd_off_hook;
                BAL3VAL=Lquadrant_bal_3_Amd_off_hook;
                }
                }

(*channel_pointer).on_hook_loss=cable_loss;
        if(SLIC==ERICKSON_SLIC){
                xmt_gain = cable_loss + eric_xmt_lvl_offset;
                rcv_gain= eric_rcv_lvl_offset - cable_loss;
        }
        else{
                xmt_gain = cable_loss + amd_xmt_lvl_offset;
                rcv_gain= amd_rcv_lvl_offset - cable_loss;
        } rcv_gain=~rcv_gain;
        rcv_gain=reverse_bit_for_8051_serialbus(rcv_gain);
        xmt_gain =~xmt_gain;
        xmt_gain=reverse_bit_for_8051_serialbus(xmt_gain);
        IE=Activate_Ds0_Interrupt;
}

/****************************************************************/
/*                      COPYRIGHT 1991                          */
/*                   TELTREND INCORPORATED                      */
/*                    ALL RIGHT RESERVED                        */
/****************************************************************/
/*acomdec.c                                                     */
/****************************************************************/
/*            APLICATION COMMON DECODER FOR AUA59               */
/****************************************************************/
/*apl_common_decoder:                                           */
/*If there is no CGA or QUIET in progress,the routine will decoder received */
/*signalling and then format the control byte for SLIC chip. Whenever the  */
/*unit receives the ringing pattern,it will set up 250 ms in which the unit */
/*will send out the quiet code to the COT end ,right after the remove of    */
/*ringing (Required for Call ID fixed)                          */
/****************************************************************/
#include <reg51.h>              /*Franklin 8051 resgister header file */
```

```c
#include <aportdf.h>      /*Aplication port definition header file */
#include <intrins.h>      /*Franklin 8051 special function header file */
#include <extern.h>       /*Module extern structure and rams file */
#include <avardef.h>      /*Aplication defined constant header file */
include <cvardef.h>      /*Core constant defined header file */ void test_volt_glitch_check();
apl_common_decoder()
{
data char rev_rsig;
data char status;
rev_rsig =(*channel_pointer).old_rsig;
if(CGA_flag | QUIET_flag) /*Check for CGA or QUIET is in progress */
{
        return; /*Yes It is ,Do nothing return */
}
            /*Normal received signalling decoder */
CGA_flag=NO;
QUIET_flag=NO;
TEST_TONE=NO;
rev_rsig= _cror_(rev_rsig,4);/*Relocate A,B,C,D bits */
rev_rsig=rev_rsig &  keep_low_nibble;   /*Keep only ABCD bits*/
switch(rev_rsig)
{
   case ground_start_0000:
        test_volt_glitch_check();
        forward_disconnect_flag=NO;
        ring_trip_flag=NO;
        voltage_flag=low_voltage;
        if(wait_for_350ms==YES)
        {
                return;
        }
        else
        {
        if((*channel_pointer).old_tsig==OFF_HOOK && loop_flag==NO)
        {
                /*This code takes care dial one problem */
                (*channel_pointer).event_timer=delay_for_350ms;
                wait_for_350ms=YES;
                loop_flag=YES;
                (*channel_pointer).out_to_slc=TIP_OPEN;
        }
        else
        {
            wait_for_350ms=NO;
            loop_flag=NO;
           (*channel_pointer).out_to_slc=TIP_OPEN;

}
           (*channel_pointer).last_rsig=rev_rsig;
           break;
        }
   case channel_test_0101:/* Add later*/
        if(CHANNEL==A_channel)
        {
          if(! DATA04_7)
          {
            A_TEST_ON=YES;
            if(Achannel_rams.last_rsig !=rev_rsig)
            A_GLITCH=YES;
            loa_rams_addr.write_bcl_mode=bolmode | force_service_request;
            (*channel_pointer).out_to_slc=NORMAL;/*001*/
          }
           Achannel_rams.last_rsig=rev_rsig;
          break;
        }
        if(CHANNEL==B_channel)
        {
           if(! DATA04_6)
           {
            B_TEST_ON=YES;
            if(Bchannel_rams.last_rsig !=rev_rsig)
            B_GLITCH=YES;
            loa_rams_addr.write_bcl_mode=bolmode | force_service_request;
            (*channel_pointer).out_to_slc=NORMAL;/*001*/
           }
        Bchannel_rams.last_rsig=rev_rsig;
        break;
         }
```

```
    case idle_with_tip_0001:
    case idle_with_tip_0010:
    case idle_with_tip_0011:
    case idle_with_tip_0100:
    case idle_with_tip_0110:
    case idle_with_tip_0111:
    case idle_with_tip_1000:
    case idle_with_tip_1001:
    case idle_with_tip_1100:
    case idle_with_tip_1101:
    case idle_with_tip_1111:
        test_volt_glitch_check();
        forward_disconnect_flag=NO;
        ring_trip_flag=no_ring_trip;
        (*channel_pointer).out_to_slc=NORMAL;/*010*/
        (*channel_pointer).last_rsig=rev_rsig;
        if(wait_for_350ms==YES || wait_for_2500ms==YES)
        {
            /*After forward disconnect,allowing 30ms delay
              for bridge over,so the loop detector could
              be very much settle.*/

(*channel_pointer).event_timer=load_30ms_delay;
        }
        if((*channel_pointer).tpcm_quiet_timer!=EXPIRED) TPCM_QUIET=YES;
        wait_for_350ms=NO;
        wait_for_2500ms=NO;
        loop_flag=NO;
        break;
    case ringing_1011:
    case ringing_1110:
        test_volt_glitch_check();
        (*channel_pointer).last_rsig=rev_rsig;
        forward_disconnect_flag=NO;
        if((ring_trip_flag==YES) || (LOOP==loop_active_low))
        {

{
                break;
            }
        else
            {
            (*channel_pointer).out_to_slc=RINGING;/*001*/
            (*channel_pointer).tpcm_quiet_timer=
            time_for_quiet_tpcm;/*Call ID fixed requirement */
            voltage_flag=High_voltage;
            wait_for_350ms=NO;
            wait_for_2500ms=NO;
            loop_flag=NO;
            break;
            }
    case forward_disconnect_1010:
        test_volt_glitch_check();
        (*channel_pointer).last_rsig=rev_rsig;
        ring_trip_flag=no_ring_trip;
        voltage_flag=low_voltage;
        if(wait_for_350ms==YES | wait_for_2500ms==YES)
        {
            return;
        }
        else
        {
            if(forward_disconnect_flag) return;
            else
            {
                (*channel_pointer).out_to_slc=TIP_OPEN;
                (*channel_pointer).event_timer=delay_for_350ms;
                wait_for_350ms=YES;
                wait_for_2500ms=YES;
                forward_disconnect_flag=YES;
            }
            return;
        }
    default:
        return;
    }
}
void test_volt_glitch_check()
{
            /*After sending channel test to required channel,the
              BCU will come back and ask for channel status.This events
```

```
        has to occur in sequence. In order make sure the event
        occured correctly, the channel unit will set GLITCH flag
        bit whenever it received channel test. So if the BCU
        don't come back and check channel test status, this GLITCH
        never clear, eventhough channel test is removed, as the result
        the channel TEST_ON flag will be set forever and channel
        request for test service never clear
        Note :GLITCH flag is clear in message interrupt routine.
        */ if(CHANNEL==A_channel)
        {
                if(A_GLITCH & DATA04_7==NO)
                A_TEST_ON=NO;
        } if(CHANNEL==B_channel)
        {
                if(B_GLITCH & DATA04_6==NO)
                B_TEST_ON=NO;
        }
}
```

A copy of the look up table use for automatic loss compensation follows.

```
;*****************************************************************************/
;                         COPYRIGHT 1991                                     */
;                      TELTREND INCORPORATED                                 */
;                       ALL RIGHT RESERVED                                   */
;                        PCM TABLE FOR ALC                                   */
;*****************************************************************************/

PCMTBL42:
DB 01H

DB 01H,02H,02H,03H,04H,04H,05H,05H
DB 06H,06H,07H,08H,08H,09H,09H,0aH
DB 0bH,0bH,0cH,0cH,0dH,0dH,0eH,0fH    42V
DB 0fH,10H,10H,11H,12H,12H,13H,13H
DB 14H,14H,15H,16H,16H,17H,17H,18H
DB 19H,19H,1aH,1aH,1bH,1bH,1cH,1dH
DB 1dH,1eH,1eH,1fH,20H,20H,21H,21H
DB 22H,22H,23H,24H,24H,25H,25H,26H
DB 26H,27H,28H,28H,29H,29H,2aH,2bH    42.5V
DB 2bH,2cH,2cH,2dH,2dH,2eH,2fH,2fH
DB 30H,30H,31H,32H,32H,33H,33H,34H
DB 34H,35H,36H,36H,37H,37H,37H,37H

PCMTBL43:
DB 01H
DB 01H,01H,02H,03H,03H,04H,04H,05H
DB 06H,06H,07H,07H,08H,09H,09H,0aH
DB 0aH,0bH,0bH,0cH,0dH,0dH,0eH,0eH
DB 0fH,10H,10H,11H,11H,12H,13H,13H    43V
DB 14H,14H,15H,15H,16H,17H,17H,18H
DB 18H,19H,1aH,1aH,1bH,1bH,1cH,1dH
DB 1dH,1eH,1eH,1fH,1fH,20H,21H,21H
DB 22H,22H,23H,24H,24H,25H,25H,26H
DB 27H,27H,28H,28H,29H,29H,2aH,2bH    43.5V
DB 2bH,2cH,2cH,2dH,2dH,2eH,2fH,2fH
DB 30H,31H,31H,32H,32H,33H,33H,34H
DB 35H,35H,36H,36H,37H,37H,37H,37H
DB 37H,37H
```

```
PCHTBL44:
DB 02H
DB 02H,02H,03H,03H,04H,05H,05H,06H
DB 06H,07H,08H,08H,09H,0aH,0aH,0bH
DB 0bH,0cH,0dH,0dH,0eH,0eH,0fH,10H
DB 10H,11H,12H,12H,13H,13H,14H,15H        44V
DB 15H,16H,16H,17H,18H,18H,19H,19H
DB 1aH,1bH,1bH,1cH,1dH,1dH,1eH,1eH
DB 1fH,20H,20H,21H,21H,22H,23H,23H
DB 24H,24H,25H,26H,26H,27H,28H,28H
DB 29H,29H,2aH,2bH,2bH,2cH,2cH,2dH        44.5V
DB 2eH,2eH,2fH,30H,30H,31H,31H,32H
DB 33H,33H,34H,34H,35H,36H,36H,37H
DB 37H,37H,37H,37H,37H,37H         44.5V

PCHTBL45:
DB 01H
DB 01H,02H,03H,03H,04H,04H,05H,06H
DB 06H,07H,07H,08H,09H,09H,0aH,0bH
DB 0bH,0cH,0cH,0dH,0eH,0eH,0fH,10H        45V
DB 10H,11H,11H,12H,13H,13H,14H,14H
DB 15H,16H,16H,17H,18H,18H,19H,19H
DB 1aH,1bH,1bH,1cH,1dH,1dH,1eH,1eH
DB 1fH,20H,20H,21H,21H,22H,23H,23H
DB 24H,25H,25H,26H,26H,27H,28H,28H
DB 29H,2aH,2aH,2bH,2bH,2cH,2dH,2dH        45.5V
DB 2eH,2eH,2fH,30H,30H,31H,32H,32H
DB 33H,33H,34H,35H,35H,36H,37H,37H
DB 37H,37H,37H,37H,37H

PCHTBL46:
DB 01H
DB 01H,02H,03H,03H,04H,04H,05H,06H
DB 06H,07H,08H,08H,09H,0aH,0aH,0bH
DB 0bH,0cH,0dH,0dH,0eH,0fH,0fH,10H
DB 10H,11H,12H,12H,13H,14H,14H,15H        46V
DB 16H,16H,17H,17H,18H,19H,19H,1aH
DB 1bH,1bH,1cH,1cH,1dH,1eH,1eH,1fH
DB 20H,20H,21H,22H,22H,23H,23H,24H
DB 25H,25H,26H,27H,27H,28H,29H,29H        46.5V
DB 2aH,2aH,2bH,2cH,2cH,2dH,2eH,2eH
DB 2fH,2fH,30H,31H,31H,32H,33H,33H
DB 34H,35H,35H,36H,36H,37H,37H,37H
DB 37H,37H,37H

PCHTBL47:
DB 02H
DB 02H,02H,03H,04H,04H,05H,06H,06H
DB 07H,08H,08H,09H,09H,0aH,0bH,0bH
DB 0cH,0dH,0dH,0eH,0fH,0fH,10H,11H
DB 11H,12H,13H,13H,14H,15H,15H,16H        47V
DB 17H,17H,18H,19H,19H,1aH,1bH,1bH
DB 1cH,1cH,1dH,1eH,1eH,1fH,20H,20H
DB 21H,22H,22H,23H,24H,24H,25H,26H
DB 26H,27H,28H,28H,29H,2aH,2aH,2bH        47.5V
DB 2cH,2cH,2dH,2dH,2eH,2fH,2fH,30H
DB 31H,31H,32H,33H,33H,34H,35H,35H
DB 36H,37H,37H,37H,37H,37H,37H,37H
DB 37H

PCHTBL48:
DB 02H
DB 02H,02H,03H,04H,04H,05H,06H,06H
```

```
DB 07H,08H,08H,09H,0aH,0aH,0bH,0bH
DB 0cH,0dH,0dH,0eH,0fH,0fH,10H,11H       48V
DB 11H,12H,13H,13H,14H,15H,15H,16H
DB 17H,17H,18H,19H,19H,1aH,1bH,1bH
DB 1cH,1dH,1dH,1eH,1eH,1fH,20H,20H
DB 21H,22H,22H,23H,24H,24H,25H,26H       48.5V
DB 26H,27H,28H,28H,29H,2aH,2aH,2bH
DB 2cH,2cH,2dH,2eH,2eH,2fH,30H,30H
DB 31H,31H,32H,33H,33H,34H,35H,35H
DB 36H,37H,37H,37H,37H,37H,37H,37H

PCMTBL49:
DB 02H
DB 02H,03H,03H,04H,05H,05H,06H,07H
DB 07H,08H,09H,09H,0aH,0bH,0bH,0cH
DB 0dH,0dH,0eH,0fH,0fH,10H,11H,11H       49V
DB 12H,13H,13H,14H,14H,15H,16H,16H
DB 17H,18H,18H,19H,1aH,1aH,1bH,1cH
DB 1cH,1dH,1eH,1eH,1fH,20H,20H,21H
DB 22H,22H,23H,24H,24H,25H,26H,26H
DB 27H,28H,28H,29H,2aH,2aH,2bH,2cH       49.5V
DB 2cH,2dH,2eH,2eH,2fH,30H,30H,31H
DB 32H,32H,33H,34H,34H,35H,36H,36H
DB 37H,37H,37H,37H,37H,37H,37H

PCMTBL50:

DB 02H
DB 02H,03H,03H,04H,05H,05H,06H,07H
DB 07H,08H,09H,09H,0aH,0bH,0bH,0cH
DB 0dH,0dH,0eH,0fH,10H,10H,11H,12H       50V
DB 12H,13H,14H,14H,15H,16H,16H,17H
DB 18H,18H,19H,1aH,1aH,1bH,1cH,1cH
DB 1dH,1eH,1eH,1fH,20H,20H,21H,22H
DB 22H,23H,24H,25H,25H,26H,27H,27H       50.5V
DB 28H,29H,29H,2aH,2bH,2bH,2cH,2dH
DB 2dH,2eH,2fH,2fH,30H,31H,31H,32H
DB 33H,33H,34H,35H,35H,36H,37H,37H
DB 37H,37H,37H,37H,37H

PCMTBL51:
DB 02H
DB 02H,02H,03H,04H,04H,05H,06H,06H
DB 07H,08H,09H,09H,0aH,0bH,0bH,0cH
DB 0dH,0dH,0eH,0fH,0fH,10H,11H,11H       51V
DB 12H,13H,13H,14H,15H,16H,16H,17H
DB 18H,18H,19H,1aH,1aH,1bH,1cH,1cH
DB 1dH,1eH,1eH,1fH,20H,21H,21H,22H
DB 23H,23H,24H,25H,25H,26H,27H,27H       51.5V
DB 28H,29H,29H,2aH,2bH,2bH,2cH,2dH
DB 2eH,2eH,2fH,30H,30H,31H,32H,32H
DB 33H,34H,34H,35H,36H,36H,37H,37H
DB 37H,37H,37H,37H

PCMTBL52:
DB 02H
DB 02H,03H,03H,04H,05H,05H,06H,07H
DB 08H,08H,09H,0aH,0aH,0bH,0cH,0cH
DB 0dH,0eH,0eH,0fH,10H,11H,11H,12H       52V
DB 13H,13H,14H,15H,15H,16H,17H,18H
DB 18H,19H,1aH,1aH,1bH,1cH,1cH,1dH
DB 1eH,1eH,1fH,20H,21H,21H,22H,23H
DB 23H,24H,25H,25H,26H,27H,27H,28H       52.5V
DB 29H,2aH,2aH,2bH,2cH,2cH,2dH,2eH
```

```
     DB 2eH, 2fH, 30H, 30H, 31H, 32H, 33H, 33H
     DB 34H, 35H, 35H, 36H, 37H, 37H, 37H, 37H
     DB 37H, 37H, 37H

PCHTBL53:
     DB 02H
     DB 02H, 03H, 04H, 04H, 05H, 06H, 07H, 07H        53V
     DB 08H, 09H, 09H, 0aH, 0bH, 0bH, 0cH, 0dH
     DB 0eH, 0eH, 0fH, 10H, 10H, 11H, 12H, 13H
     DB 13H, 14H, 15H, 15H, 16H, 17H, 17H, 18H        53V
     DB 19H, 1aH, 1aH, 1bH, 1cH, 1cH, 1dH, 1eH
     DB 1eH, 1fH, 20H, 21H, 21H, 22H, 23H, 23H
     DB 24H, 25H, 25H, 26H, 27H, 28H, 28H, 29H
     DB 2aH, 2aH, 2bH, 2cH, 2dH, 2dH, 2eH, 2fH        53.5V
     DB 2fH, 30H, 31H, 31H, 32H, 33H, 34H, 34H
     DB 35H, 36H, 36H, 37H, 37H, 37H, 37H, 37H
     DB 37H, 37H

PCHTBL54:
     DB 03H
     DB 03H, 03H, 04H, 05H, 06H, 06H, 07H, 08H
     DB 08H, 09H, 0aH, 0bH, 0bH, 0cH, 0dH, 0dH
     DB 0eH, 0fH, 10H, 10H, 11H, 12H, 12H, 13H

DB 14H, 14H, 15H, 16H, 17H, 17H, 18H, 19H        54V
     DB 19H, 1aH, 1bH, 1cH, 1cH, 1dH, 1eH, 1eH
     DB 1fH, 20H, 21H, 21H, 22H, 23H, 23H, 24H
     DB 25H, 26H, 26H, 27H, 28H, 28H, 29H, 2aH
     DB 2bH, 2bH, 2cH, 2dH, 2dH, 2eH, 2fH, 30H        54.5V
     DB 30H, 31H, 32H, 32H, 33H, 34H, 34H, 35H
     DB 36H, 37H, 37H, 37H, 37H, 37H, 37H, 37H
     DB 37H

PCHTBL55:
     DB 03H
     DB 03H, 04H, 05H, 05H, 06H, 07H, 08H, 08H
     DB 09H, 0aH, 0aH, 0bH, 0cH, 0dH, 0dH, 0eH
     DB 0fH, 10H, 10H, 11H, 12H, 12H, 13H, 14H
     DB 15H, 15H, 16H, 17H, 17H, 18H, 19H, 1aH        55V
     DB 1aH, 1bH, 1cH, 1dH, 1dH, 1eH, 1fH, 1fH
     DB 20H, 21H, 22H, 22H, 23H, 24H, 24H, 25H
     DB 26H, 27H, 27H, 28H, 29H, 2aH, 2aH, 2bH
     DB 2cH, 2cH, 2dH, 2eH, 2fH, 2fH, 30H, 31H        55.5V
     DB 31H, 32H, 33H, 34H, 34H, 35H, 36H, 36H
     DB 37H, 37H, 37H, 37H, 37H, 37H, 37H, 37H

PCHTBL56:
     DB 05H
     DB 05H, 05H, 06H, 07H, 08H, 08H, 09H, 0aH
     DB 0bH, 0bH, 0cH, 0dH, 0dH, 0eH, 0fH, 10H
     DB 10H, 11H, 12H, 13H, 13H, 14H, 15H, 16H        56V
     DB 16H, 17H, 18H, 19H, 19H, 1aH, 1bH, 1cH
     DB 1cH, 1dH, 1eH, 1eH, 1fH, 20H, 21H, 21H
     DB 22H, 23H, 24H, 24H, 25H, 26H, 27H, 27H        56.5V
     DB 28H, 29H, 2aH, 2aH, 2bH, 2cH, 2dH, 2dH
     DB 2eH, 2fH, 2fH, 30H, 31H, 32H, 32H, 33H
     DB 34H, 35H, 35H, 36H, 37H, 37H, 37H, 37H
     DB 37H, 37H, 37H, 37H, 37H
```

A preferred embodiment of the present inventions has been described herein. It is to be understood, of course, that changes and modifications may be made in the preferred embodiment without departing from the true scope and spirit of the present invention, as defined by the appended claims.

We claim:

1. A gain or loss compensation circuit, interconnected between a digital carrier transmission line and a customer loop telephone line, said telephone line defining a length, comprising, in combination:

a converter, interconnected to said transmission line, for accepting a receive digital data signal and converting said receive digital data signal to a receive intermediate analog signal and for accepting a transmit intermediate analog signal and converting said transmit intermediate analog signal to a transmit digital data signal, said converter changing said analog signals with a variable gain in response to a compensation signal;

an interface circuit, interconnected between said converter and said telephone line, for accepting said receive intermediate analog signal and providing a receive analog telephone signal to said telephone line and for accepting a transmit analog telephone signal from said telephone line and providing a transmit intermediate analog signal to said converter, said interface circuit including a pulse width modulated power converter defining a pulse width, said pulse width being correlated to said length of said telephone line, and said interface circuit providing a direct current to said telephone line related to said pulse width;

a gate array for sensing said pulse width of said power converter and responsively providing a measured signal representative of said pulse width; and a controller for receiving said measured signal and responsively providing said compensation signal to said converter to vary said variable gain of said converter relative to said pulse width of said power converter and said length of said telephone line.

2. A compensation circuit as claimed in claim 1 wherein said converter includes a digital to analog converter for accepting said receive digital data signal from said digital carrier transmission line and responsively producing a receive analog signal;

a programmable receive amplifier, with a variable gain, for accepting said receive analog signal and responsively providing said receive intermediate analog signal to said interface circuit;

a programmable transmit amplifier, with a variable gain, for receiving said transmit intermediate analog signal from said interface circuit and responsively providing a transmit analog amplified signal; and an analog to digital converter for accepting said transmit analog amplified signal and responsively providing said transmit digital data signal to said digital carrier transmission line.

3. A compensation circuit as claimed in claim 2 further comprising a voltage source exhibiting a direct current voltage and powering said interface circuit, voltage measurement means for measuring said voltage supplied by said voltage source and providing a voltage level signal to said controller, and wherein said gate array comprises a clock and gate counter, said clock providing clock pulses to said gate counter and said gate counter comparing said clock pulses with said pulse width of said power converter and responsively providing a duty cycle signal to said controller, said voltage level signal and duty cycle signal cooperatively defining said compensation signal.

4. A compensation circuit as claimed in claim 3 wherein said voltage measurement means includes a timing capacitor intermittently interconnected to said voltage supply, said timing capacitor exhibiting a charge time, and wherein said gate array compares said clock pulses with said charge time and responsively provides said voltage level signal to said controller.

5. A compensation circuit as claimed in claim 1 wherein said controller for receiving said measured signal employs a table to calculate said compensation signal.

* * * * *